United States Patent [19]

Anderson et al.

[11] Patent Number: 4,656,664
[45] Date of Patent: Apr. 7, 1987

[54] METHOD FOR REDUCING A BINARY IMAGE

[75] Inventors: Karen L. Anderson, Peekskill; Frederick C. Mintzer, Shrub Oak, both of N.Y.

[73] Assignee: International Business Machines Corporation, Armonk, N.Y.

[21] Appl. No.: 664,137

[22] Filed: Oct. 24, 1984

[51] Int. Cl.$^4$ .............................................. G06K 9/42
[52] U.S. Cl. ...................................................... 382/47
[58] Field of Search ........................... 382/47; 358/22; 340/731

[56] References Cited

U.S. PATENT DOCUMENTS

| | | | |
|---|---|---|---|
| 3,976,982 | 8/1976 | Eiselen | 382/47 |
| 4,280,143 | 7/1981 | Judd | 358/260 |
| 4,303,948 | 12/1981 | Arai et al. | 358/903 |
| 4,435,703 | 3/1984 | Hunt et al. | 340/731 |

Primary Examiner—Anthony V. Ciarlante
Attorney, Agent, or Firm—George E. Clark; Thomas P. Dowd

[57] ABSTRACT

The method of the present invention reduces a binary digital image in size by a factor F by a method including the steps of: storing the image in bit sequence; removing one or more rows of bits along the vertical axis of the image to convert i rows of bits to j rows of bits where $0.5i \leq j < i$; modifying a line adjacent to each line discarded to preserve selected information from the discarded line; repeating the steps of removing and modifying a predetermined number of times to achieve a reduction by a factor F1 along the vertical axis; rotating the image in a first direction by ninety degrees; removing one or more rows of bits along the original horizontal axis of the image to convert i rows of bits to j rows of bits where $0.5i \leq j < i$; modifying a line adjacent to each line discarded to preserve selected information from the discarded line; repeating the steps of removing and modifying a predetermined number of times to achieve a reduction by a factor F2 along the original horizontal axis; rotating the image back to its original orientation; storing the reduced size image generated by the above steps.

10 Claims, 6 Drawing Figures

Steps of the Reduction Process

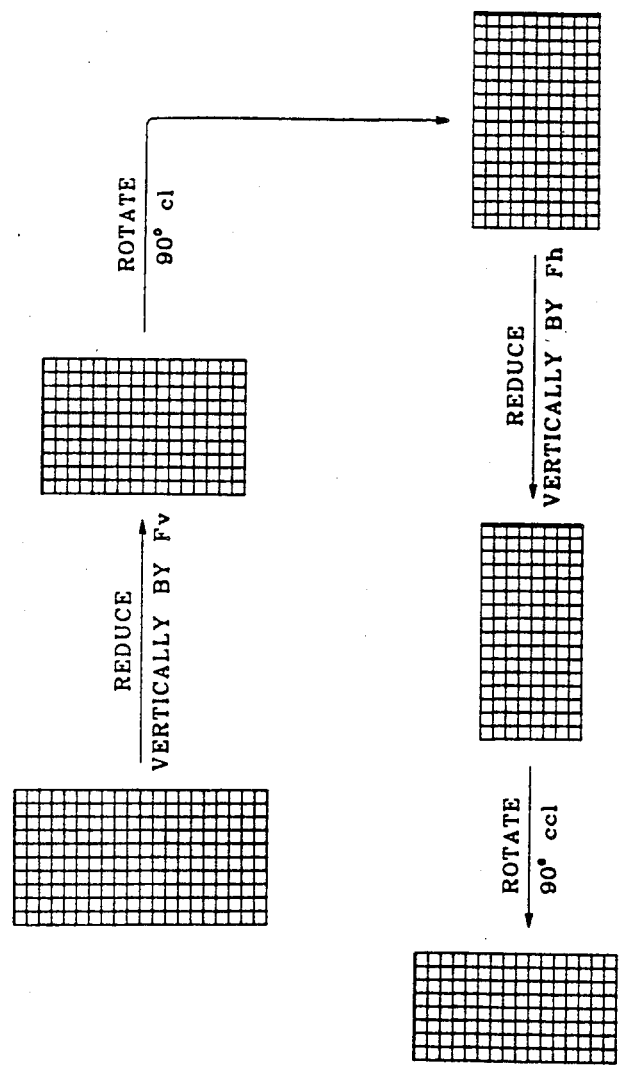
FIG 1. Steps of the Reduction Process

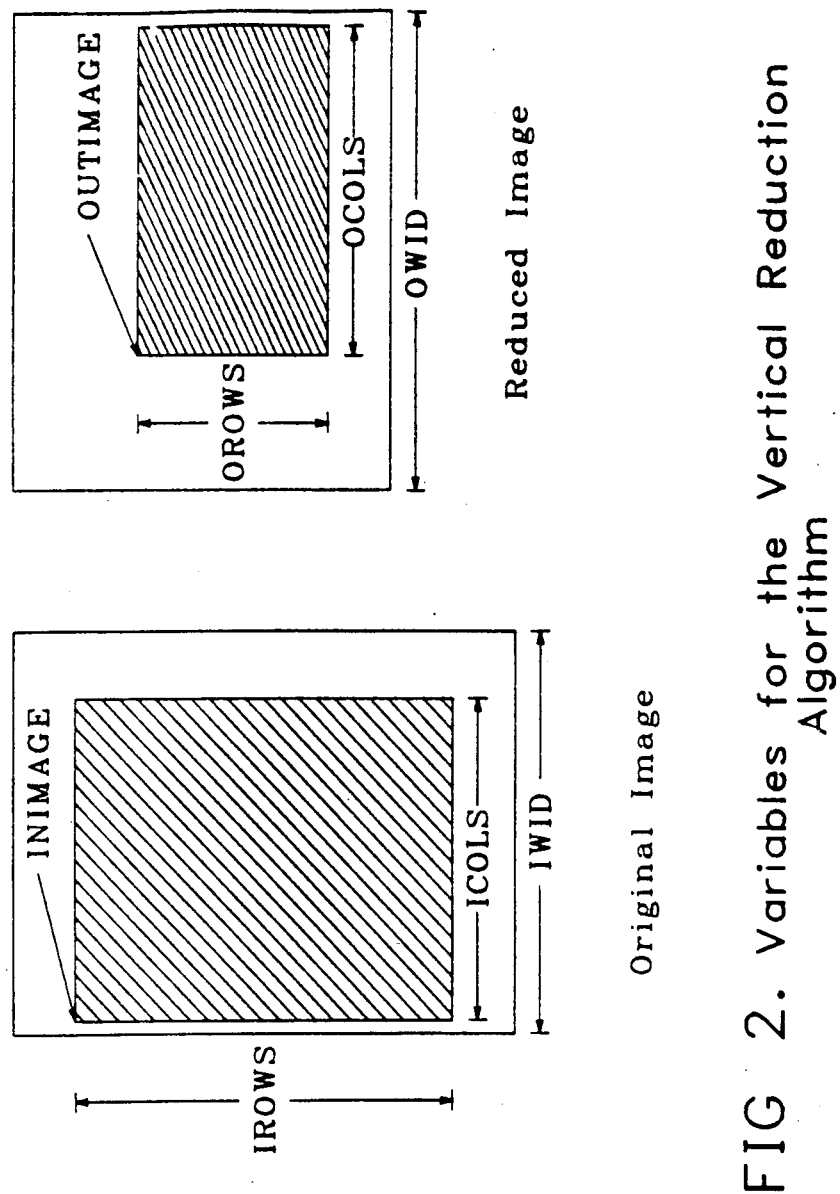
FIG 2. Variables for the Vertical Reduction Algorithm

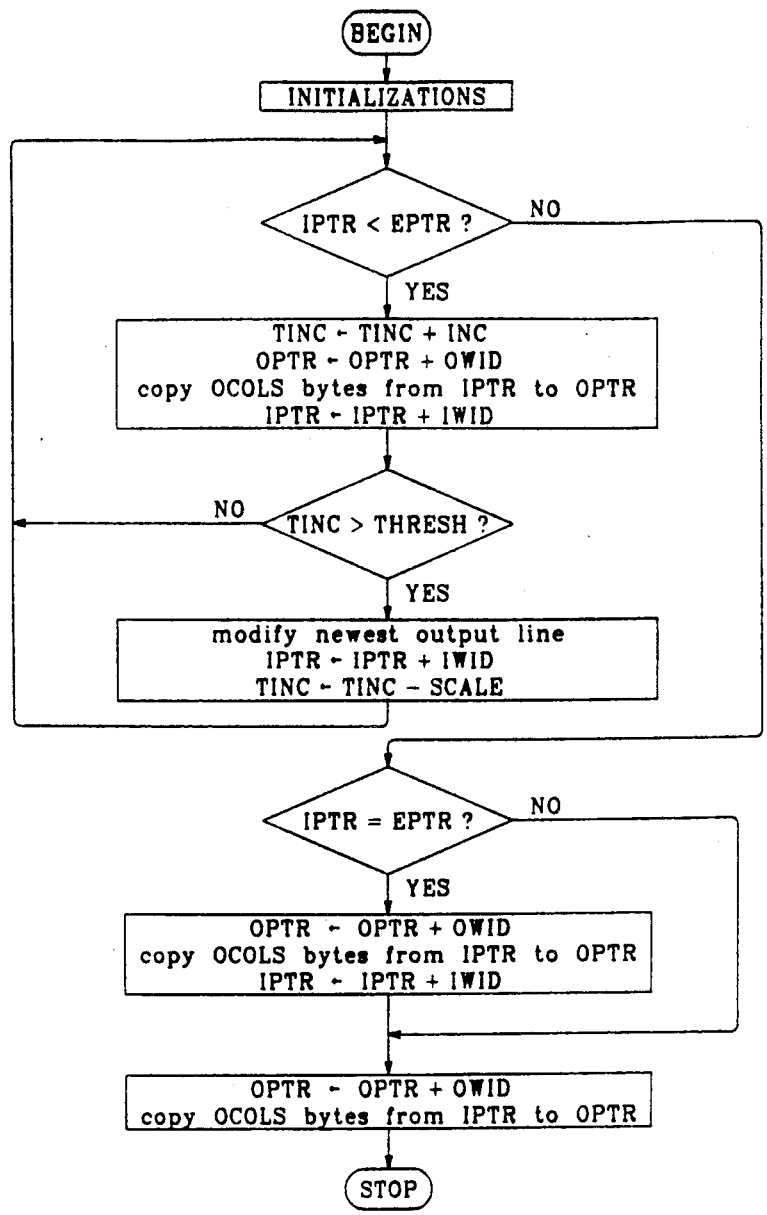
FIG 3. Vertical Reduction Algorithm

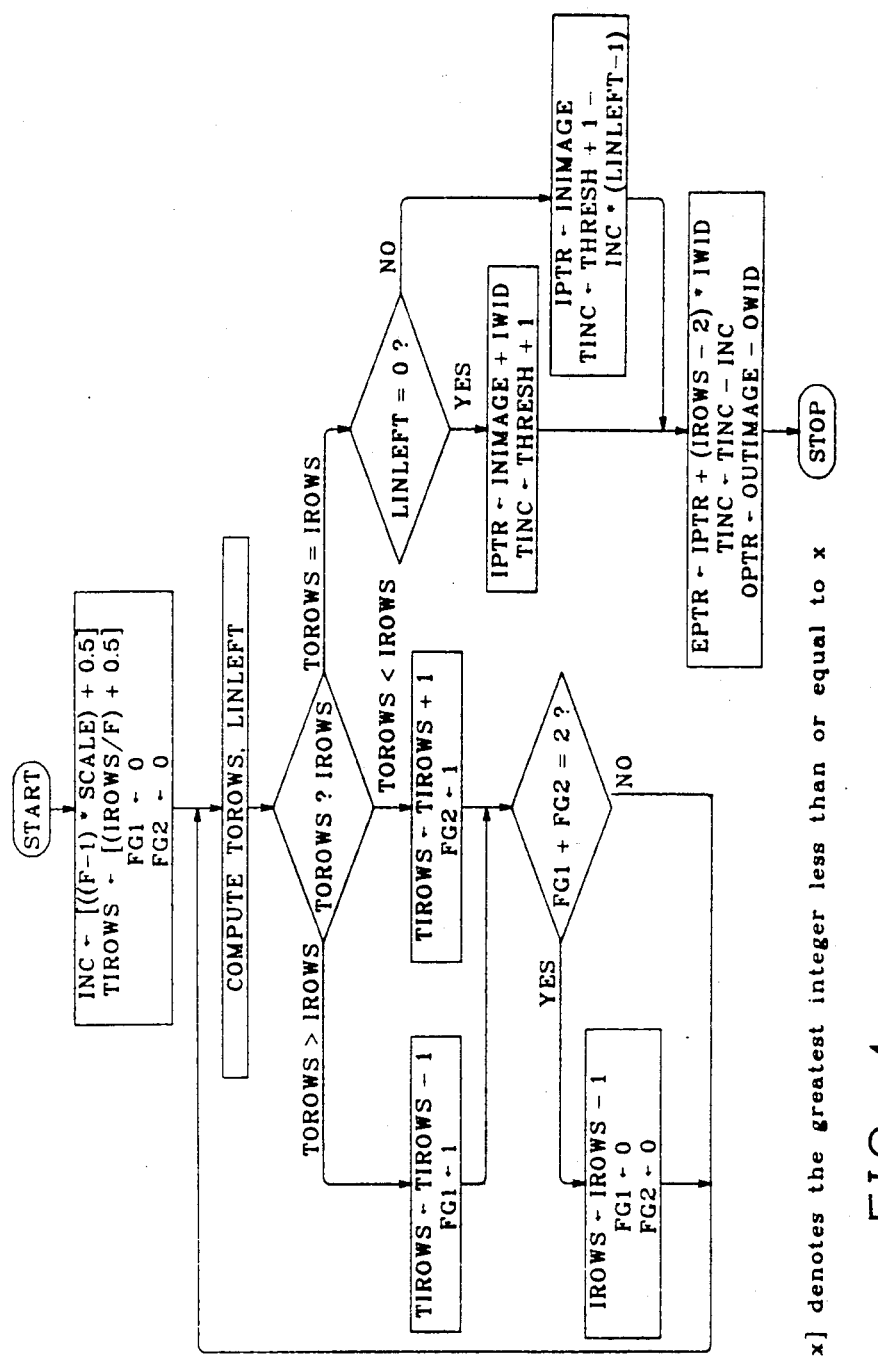
FIG. 4. Initializations for Vertical Reduction
[x] denotes the greatest integer less than or equal to x

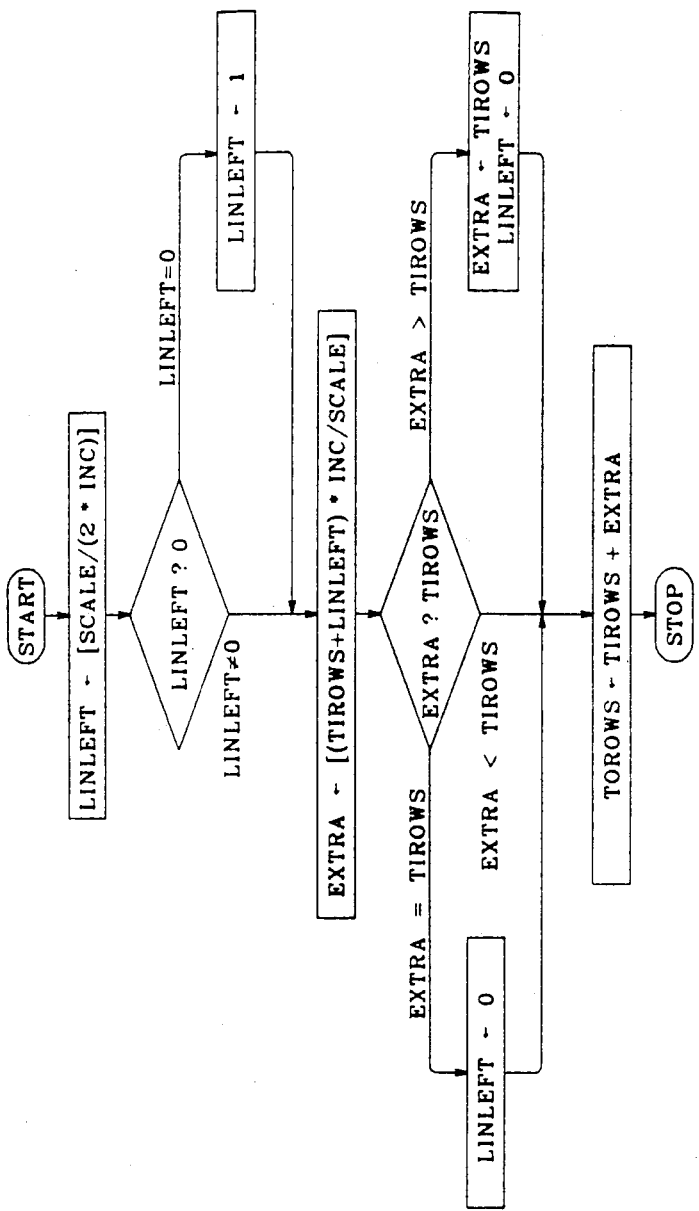
FIG 5. Calculation of TOROWS and LINLEFT

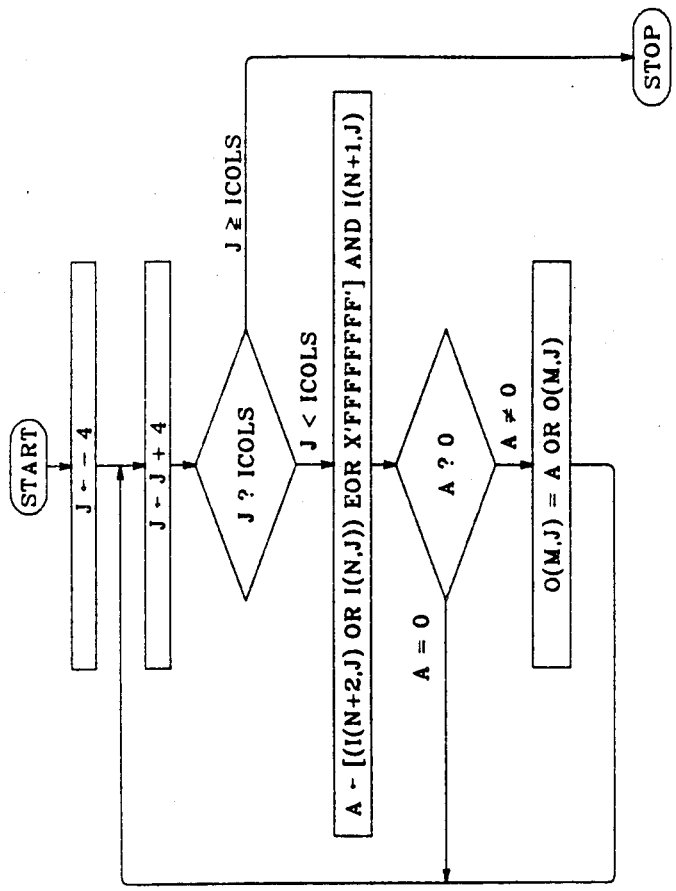
FIG.6  Line Modification Algorithm

METHOD FOR REDUCING A BINARY IMAGE

BACKGROUND OF THE INVENTION

1. Field of the Invention

The present invention relates to digital image processing methods and more particularly to improved methods for image reduction.

2. Description of the Prior Art

The following are systems representative of the prior art.

U.S. patent application Ser. No. 840,627 filed 3-17-86 of F. C. Mintzer et al, assigned to a common assignee, shows a method for reducing a binary image including the steps of: storing the image in bit sequence; dividing the image into transposable blocks; transposing by look up table, for each block having any nonzero data, each group of 6 bits along a first axis to a group of 5 bits; transposing by look up table, for each block having any nonzero data, each group of 6 bits along a second axis to a group of 5 bits; storing said transposed blocks.

The method of the patent application, while efficient for the intended application, is not able to reduce an image by an arbitrary factor selected by the user as is the present invention. Further, the method of the patent application does not employ a method in which image rotation is used to simplify the reduction algorithm to a single direction which acts on each axis of the image separately; this simplification is unnecessary when the reduction factor is fixed.

U.S. Pat. No. 4,280,143 (Judd) shows apparatus for reduction of image data. Judd divides the input image into units of (possibly) unequal numbers of pels. Judd's method reduces each input unit to a single output pel, taking into account pels from neighboring input subgroups (left of, right of, and above the input unit being compacted) as well as previous output pels. The present invention, in contrast, considers an input window of only three vertically aligned pels. It does not consider neighboring input subgroups or previous output pels. Indeed, no sub-blocks are generated or considered. Furthermore, the present invention computes a multiplicity of outputs at a time, which entails a more efficient software embodiment.

Judd's method handles reductions by fractions (a/b) conceptually by enlarging first by 1:a (through replicating pels) then reducing by b:1, where b would be the size of the input group. This could be clumsy for fractions with large values of a and/or b. The method according to the present invention neither generates nor considers sub-blocks; lines are removed/modified at points calculated by a counter. Thus no additional complexity is introduced if a and/or b are large.

A major feature of the present invention that is not shown by the Judd patent is the double rotation of the image during reduction. This makes it practical to implement in software on a general-purpose computer. The Judd patent describes a hardware implementation. In that environment the reading of columns of bits is straightforward; but it is not clear how that could be done in software.

U.S. Pat. No. 4,303,948 describes both an image reduction process and an image expansion process. The reduction process differs from the method of the present invention in that it does not allow reduction by an arbitrary factor and that it discards bits according to a predetermined pattern without attempting to ensure that no runs are destroyed.

The patented algorithm requires two page memories; it apparently does not allow expansion in situ.

U.S. Pat. No. 4,435,703 deals with a method for displaying predefined dot patterns (which are matrices of binary values); but it does not tell how to create the dot patterns. The method of the present invention shows how to generate the binary dot patterns to be displayed.

U.S. Pat. No. 4,428,065 deals with displaying predefined dot patterns of two different sizes simultaneously on the same display device. It deals with coded information rather than image data. The dot patterns for the two sizes of text are precanned; the patent also does not deal how the dot patterns were generated.

U.S. Pat. No. 3,976,982 is limited to reductions by integer factors. The reduction is done by looking at which color pixel predominates in an MxN field which is to be reduced to a single pixel; adjacent fields are not considered. This patent also shows an enlargement algorithm, but this algorithm is limited to integer factors and consists of merely replicating each pixel enough times to fill a corresponding MxN field.

U.S. Pat. No. 4,267,573 operates by transforming images (e.g. to a log spiral coordinate system).

U.S. Pat. No. 4,153,896 reduces the image first in one dimension and then in the other. This patent relies on special purpose hardware, to read an image in either scan dimension, and does not rotate the image as does the present invention. It is not appropriate for direct implementation in software, since most computers do not have this hardware capability. It is capable of scaling (enlarging or reducing) by an arbitrary factor. However, the reduction process uses essentially a majority-logic system to collapse several pels into one; this would tend to lose fine lines in large reductions.

SUMMARY OF THE INVENTION

Therefore, it is an object of the present invention to reduce a binary digital image in size by a factor F by a method including the steps of: storing the image in bit sequence; removing one or more rows of bits along the vertical axis of the image to convert i rows of bits to j rows of bits where $0.5i \leq j < i$; repeating the step of removing a predetermined number of times to achieve a reduction by a factor F1 along the vertical axis; rotating the image in a first direction by ninety degrees; removing one or more rows of bits along the original horizontal axis of the image to convert i rows of bits to j rows of bits where $0.5i \leq j < i$; repeating said step of removing a predetermined number of times to achieve a reduction by a factor F2 along the original horizontal axis; rotating the image back to its original orientation; storing the reduced size image generated by the above steps.

It is another object of the present invention to reduce the size of an image by the method set out above further including the step of modifying a line adjacent to each line discarded to preserve selected information from the discarded line.

It is yet another object of the present invention to reduce the size of an image by the method set out above wherein the step of storing the reduced size image further includes assigning said reduced image to an area of storage beginning at the same position as the area of storage in which said image was originally stored.

It is yet another object of the present invention to reduce the size of an image by the method set out above wherein the step of storing the reduced size image includes assigning the reduced image to an area of storage separate from an area of storage in which said image was originally stored.

It is yet another object of the present invention to reduce the size of an image by a method comprising the steps of: storing the image in bit sequence; initializing a counter, so that a first number of lines are copied before a first line is deleted; discarding a first input line if a reduction by a factor of 2.0 is to be performed; incrementing said counter as each input line is examined; examining each input line; deleting a line in the image and decrementing said counter if the value of said counter is greater than a fixed threshold; modifying an adjacent image line to preserve selected information from the discarded line; repeating said steps of incrementing, deleting, and modifying until no more input lines remain; storing the reduced image generated by the above steps.

The foregoing and other objects, features and advantages of the invention will be apparent from the more particular description of the preferred embodiment of the invention, as illustrated in the accompanying drawing.

BRIEF DESCRIPTION OF THE DRAWING

FIG. 1 is an illustration of the image reduction process according to the present invention.

FIG. 2 is a schematic diagram of the input and output images before and after reduction in the vertical dimension according to the present invention.

FIG. 3 is a flow chart of the vertical reduction portion of the method according to the present invention.

FIG. 4 is a flow chart showing parameter initialization for the method according to the present invention.

FIG. 5 is a flow chart showing parameter calculations for the method according to the present invention.

FIG. 6 is a flow chart showing a line modification algorithm for use with the method according to the present invention.

In the drawing, like elements are designated with similar reference numbers, and identical elements in different specific embodiments are designated by identical reference numbers.

DESCRIPTION OF PREFERRED
EMBODIMENTS OF THE INVENTION

This invention solves the problem of quickly reducing an image in two dimensions by the arbitrary factors Fh, the horizontal reduction factor, and Fv, the vertical reduction factor, subject to the constraints: $1.0 \leq Fh \leq 2.0$ and $1.0 \leq Fv \leq 2.0$. (After the reduction, the input image has approximately Fh times as many rows and approximately Fv times as many lines as the output image.) This method may also be used repeatedly to obtain greater reductions.

The image to be reduced is assumed to be a binary image, e.g. 1 bit per pel. Furthermore, the image is assumed to be stored with 8 pels packed into each byte, and each line of the image is assumed to begin on a byte boundary.

The image reduction method consists of the following novel combination of steps.
1. The image is reduced vertically by Fv.
2. The resultant image is rotated 90 degrees clockwise.
3. The resultant image is reduced vertically by Fh.
4. The resultant image is rotated by 90 degrees counterclockwise.

The four steps of the process are illustrated in FIG. 1. Image rotation methods, described in commonly assigned, co-pending U.S. patent application Ser. No. 567,214 filed 12-30-83, now U.S. Pat. No. 4,627,020 K. L. Anderson et al may be used to perform the 90-degree rotations of steps 2 and 4. The algorithm used to provide the vertical reduction is described in detail below.

Vertical Reduction Method

Steps 1 and 3 use the same algorithm to perform vertical reduction. The input image is assumed to begin an INIMAGE and to consist of IROWS lines, each of which is IWID bytes wide. The vertical reduction algorithm reduces the image that is formed by the first ICOLS bytes of each input line. The output image consists of OROWS lines, each of which is OCOLS bytes wide, with OCOLS=ICOLS. This image begons at OUTIMAGE and is embedded in an image that is OWID bytes wide. These variables are illustrated in FIG. 2.

The image reduction method is shown in FIG. 3. The initializations set up TINC (the counter controlling line deletion) and INC (used to increment TINC). A pointer EPTR is set up to point to the second-to-last line in the input image. IPTR is positioned to address the first input row to be used; OPTR is set to point OWID bytes before the beginning of the output image area, since it is incremented before any data is stored. The main loop will also require two integer constants, SCALE and THRESH. SCALE is set to 25200 in the preferred embodiment of the invention, and THRESH is calculated as (SCALE/2)−1.

The main loop of the reduction algorithm begins by comparing IPTR to EPTR to determine whether the end of the input image has been reached. If IPTR is less than EPTR then at least three input lines remain to be processed and the loop continues. The counter TINC is incremented, OPTR is incremented to address the next output line to be created, and the line of input image data at IPTR is copied into the output image at OPTR. IPTR is then incremented to point to the next input line.

The comparison of TINC and THRESH determines whether the input line addressed by IPTR is to be deleted. If not, the loop repeats. If the line is to be deleted, the image line at OPTR is modified to preserve any single-pel black runs in the line which is to be discarded. This process will be described in greater detail below. IPTR is incremented to point to the next input line, the counter TINC is reduced, and the loop repeats.

When IPTR becomes greater than or equal to EPTR, then either two input lines remain (if IPTR=EPTR) or one line remains (if IPTR>EPTR). These lines are copied into the output image to complete the reduction. They are handled as a special case since neither of the last two lines has the two successor lines required by the line modification algorithm.

FIG. 4 details the initializations required for the vertical reduction algorithm. Aside from obtaining an output image with approximately IROWS/F lines, this initialization procedure is designed to guarantee that if an image is enlarged as described in commonly assigned, co-pending U.S. patent application Ser. No. 664,190 filed 8-27-84 now U.S. Pat. No. 4,514,242 of K. L. Anderson et al and then reduced by the same scale factor using the method of the present invention, the resulting image will be identical to the original image. This can be accomplished if the same rows inserted by the enlargement are removed by the reduction; the algorithms used to fill inserted rows in the enlargement and to preserve data from discarded lines in the reduction are matched so that no black pels from an inserted line can be introduced into the original data by the reduction.

The initialization process uses four additional variables. TIROWS is the number of input rows which would produce IROWS rows of output when enlarged by a factor of F (where F is the reduction factor) as described in U.S. mentioned patent application Ser. No. 664,190. TOROWS is the number of output rows which would be created when an image having TIROWS rows is enlarged by a factor of F; it would be calculated as the value of OROWS for the enlargement as described in U.S. patent application Ser. No. 664,190. FG1 and FG2 are flags which indicate whether values of TIROWS greater than or less than the desired value have been tested.

The initialization begins by calculating the amount INC used to increment the line deletion counter. INC is calculated as ((F−1)*SCALE), where F, the reduction factor, is any real number in the range of 1.0 to 2.0, inclusive. Note that the value SCALE/INC approximates the number of input lines to be kept for each line deleted: if F=2 then INC=SCALE, so one line is kept for each line deleted, while if F=1.25 then SCALE/INC=4, so four lines are copies for each line discarded. The choice of the value of SCALE as a number with many small prime factors means that reduction factors that are the ratios of small integers lead to exact periodicities in the modification of lines. Note that if INC=0, the algorithm will not reduce the image. In practice, F must be greater than (1+(1/(2*SCALE))) for a reduction to take place.

The number of rows which the output image should have (TIROWS) is calculated and the flags FG1 and FG2 are cleared. A loop is then entered which alters TIROWS if necessary to ensure that if the image to be reduced was created by enlarging a smaller image by a factor of F, then the reduction will exactly reduce that enlargement. The number of rows which would be created by enlarging an image having TIROWS rows by a factor of F as described in U.S. patent application Ser. No. 664,190 is calculated by a process to be described below, and the result (TOROWS) is compared to IROWS. If the two are equal, then the image to be reduced could have resulted from an enlargement of an image having TIROWS rows, so the reduced image should have TIROWS rows and the loop is exited. Otherwise the process is repeated with TIROWS adjusted by one in the direction which might produce a TOROWS equal to IROWS. The two flags keep track of whether too large or too small a value of TIROWS has been tried.

If both flags become set, no value of TIROWS can produce a TOROWS which is equal to IROWS. Note that in the image enlargement process, if a number N of input lines produces some number K of output lines, then N−1 input lines must produce either K−1 or K−2 output lines depending on the enlargement factor, since this factor may not be greater than two; similarly, N+1 lines must produce either K+1 or K+2 output lines. Thus, if a number of lines IROWS does not arise from any enlargement by F, then there must exist an image size which enlarges to an image with IROWS−1 lines since there are no consecutive "impossible" values. The value of IROWS is therefore decremented by one (discarding the last line of the input image), the flags are cleared, and the appropriate value of TIROWS is found by repeating the search.

After the correct value for TIROWS has been found, values for TOROWS and LINLEFT (the number of lines in the original image which precede the first line which may have been inserted by the enlargement) will have been calculated. If LINLEFT is zero, the presumed enlargement was by exactly a factor of two, so the first line is an inserted line. IPTR, the pointer to the first input line to be used, is accordingly set to address the second line of the input image (discarding the inserted first line) and TINC is set to THRESH+1, the minimum value TINC could have had in the enlargement when the line was inserted. The decrement of TINC later in the initialization and the increment at the top of the main loop of the vertical reduction procedure result in the first line being kept and the second line being deleted. If LINLEFT is nonzero, i.e. the first image line is to be kept, then IPTR is set to point to it, and TINC is set to THRESH+1−(INC*(LINLEFT−1)). TINC is decremented by INC later in the initialization process; the final result is that the main loop will have to increment TINC LINLEFT times (keeping the first LINLEFT image lines) before deleting line LINLEFT+1 (the first possibly inserted line) when TINC becomes greater than THRESH.

After IPTR and TINC are initialized, the pointer EPTR is set up to address the next to last row of the image. Exit will occur from the main loop of the reduction when IPTR reaches or passes this point (it will pass it if the next-to-last line is deleted). TINC is then decremented by INC since TINC is incremented before the first test. Finally, OPTR (the pointer to the output image lines) is set so that when it is incremented by OWID it will point to the beginning of the output image area.

FIG. 5 illustrates the procedure for calculating TOROWS and LINLEFT from a given value of TIROWS. This calculation is the same as that described in U.S. above-noted patent application Ser. No. 664,190. LINLEFT, the number of input image lines which precede the first inserted line, is calculated as the truncated value of one-half of the period of the line insertions (e.g. if a line is inserted after every five input lines, LINLEFT will be calculated as 2). If LINLEFT is zero, it is reset to one in an attempt to have at least one line of real data at the beginning of the image. EXTRA, the number of lines inserted given the value of LINLEFT selected, is then calculated. If the number of lines inserted is greater than or equal to the assumed number of input lines then an enlargement by a factor of two must have been performed. In these cases, since the first line of the output image would have been copied from the input image, the first line of the enlarged image would have been an inserted line, so LINLEFT is reset to zero. If EXTRA is greater than TIROWS it is also necessary to reduce EXTRA to assume that exactly TIROWS rows were inserted. TOROWS, the number of lines in the image which would be created by enlarging an image of TIROWS rows according to the method described in U.S. patent application Ser. No. 664,190, is the sum of TIROWS (the number of rows with which the enlargement algorithm would have started) and EXTRA (the number of rows which would have been inserted).

Line Modification Algorithm

The line modification algorithm is used to perform the operation labelled "modify newest output line" in FIG. 3. Its purpose is to preserve any one-pel-thick black lines on a line which is being deleted by transferring them to the preceding line. The procedure is as follows. Let i(n,j) be the j'th pel on input line n, and o(j) the modified value of this pel. The value of o(j) depends only on the values of i(n,j), i(n+1,j), and i(n+2,j). The values of o(j) are given by the truth table

| i(n,j) | i(n + 1,j) | i(n + 2,j) | o(j) |
|--------|------------|------------|------|
| 0      | 0          | 0          | 0    |
| 0      | 0          | 1          | 0    |
| 0      | 1          | 0          | 1    |
| 0      | 1          | 1          | 0    |
| 1      | 0          | 0          | 1    |
| 1      | 0          | 1          | 1    |
| 1      | 1          | 0          | 1    |
| 1      | 1          | 1          | 1    |

To provide processing efficiency, the line modification algorithm proceeds a word (32 bits) at a time. This provides the greater efficiency since it matches the size of a System/370 register. A flow chart for this processing is given in FIG. 6. In the figure, I(N,J) refers to the J'th word of the N'th input line, where (IPTR−IWID) points to I(N,O); O(M,J) refers to the J'th word of the M'th line of output, where OPTR points to O(M,O).

The index J is used to count across the image rows. It is initialized to −4, since the first operation of the loop is to increment it by four (because four bytes at a time are processed). When the index becomes larger than the row size, the entire row has been processed and exit from the loop occurs. Otherwise the J'th words of the two lines adjacent to the line being deleted are OR'd and the result is inverted. This produces one (black) bits in all positions for which both neighbor bits are zero. This value is ANDed with the word from the line being deleted. One bits in this result occur at positions where both neighbor bits are zero and the line to be deleted contains a one bit, i.e. where black bits to be preserved are found. If this result is zero the loop may be repeated since it is not necessary to modify the output data; the check avoids unnecessary storage operations. If the result is not zero it is OR'd into the output image line and the loop repeats.

Thus, while the invention has been described with reference to preferred embodiments thereof, it will be understood by those skilled in the art that various changes in form and details may be made without departing from the scope of the invention.

What is claimed is:

1. A method for reducing a binary digital image along two orthogonal axes by factors of F1 and F2 respectively, comprising the steps of:
   storing said image in raster scan in order in an input storage area in a computer;
   removing one or more lines of bits along one of said orthogonal axes of said stored image to convert i lines of bits to j lines of bits, where $0.5i \leq j < i$;
   repeating said step of removing a predetermined number of times to achieve a reduction by a factor F1 along said one orthogonal axis;
   rotating said reduced image in a first direction by ninety degrees;
   removing one or more lines of bits along the other of said orthogonal axes in said rotated reduced image to convert i' lines of bits to j' lines of bits where $0.5i' \leq j' < i'$;
   repeating said step of removing a predetermined number of times to achieve a reduction by a factor F2 along said other orthogonal axis; and
   rotating said reduced image in a second direction opposite said first direction by ninety degrees.

2. A method according to claim 1 further comprising the step of:
   modifying a line of said reduced image adjacent to each line removed in said stored image to preserve selected information from the removed line.

3. A method according to claim 1 further comprising the step of:
   storing said reduced image by assigning said reduced image to an area of storage beginning at the same position as the input storage area in which said image was originally stored.

4. A method according to claim 1 further comprising the step of:
   storing said reduced image by assigning said reduced image to an area of storage separate from the input storage area in which said image was originally stored.

5. A method for reducing a binary digital image along one of two orthogonal axes by any factor F greater than 1.0 and less than or equal to 2.0 comprising the steps of:
   storing said image in raster scan order in an input storage area in a computer;
   selecting an integer T for use as a threshold and an integer S such that the rounded value of (F−1)*S is not equal to zero;
   selecting a number of lines L of said stored image to copy at the beginning of the reduction process, where L is an integer greater than or equal to zero and less than or equal to 1/(F−1);
   initializing a counter to T+D−(I*X), where X is an integer equal to L if L is greater than zero or to the integer quotient 1/(F−1) otherwise, I is the rounded value of (F−1)*S, and D is 1 if S>0;
   if L is zero, discarding a first line of said stored image;
   if at least two lines of said stored image remain to be processed, processing a next line of said stored image by the steps of:
   (a) incrementing said counter by I;
   (b) copying said next line into an output storage area in which the reduced image is to be stored;
   (c) comparing the counter value to T;
   (d) if the counter value is not between T−S and T, then
      (i) discarding the next line of said stored image;
      (ii) decrementing the counter by S; and
   (e) if the counter value is between T−S and T, then omitting said steps (i) and (ii);
   repeating said processing steps (a)–(e) on the other lines of said stored image until no more than one image line in said input storage area remains to be processed; and
   copying the remaining image line, if any, in said input storage area to said output storage area.

6. A method according to claim 5 wherein said step (d) of discarding the next line further comprises transferring selected information from the discarded line to the previous copied line in said output storage area, said selection being based upon the values of the bits in the discarded line and at least one neighboring copied line.

7. A method for reducing a binary digital image along one of two orthogonal axes by any factor F, comprising the steps of:

storing said image in raster scan order in an input storage area in a computer;

rotating said stored image in said input storage area in a first direction by ninety degrees;

removing one or more lines of bits along said one of said orthogonal axes of said rotated image to convert i line of bits to j lines of bits, where $0.5i \leq j < i$, by the steps as follows:

(1) selecting an integer T for use as a threshold and an integer S such that the rounded value of $(F-1)*S$ is not equal to zero;

(2) selecting a number of lines L of said stored image to copy at the beginning of the reduction process, where L is an integer greater than or equal to zero and less than or equal to $1/(F-1)$;

(3) initializing a counter to $T+D-(I*X)$, where X is an integer equal to L if L is greater than zero or to the integer quotient $1/(F-1)$ otherwise, I is the rounded value of $(F-1)*S$, and D is 1 if $S>0$;

(4) if L is zero, discarding a first line of said stored image;

(5) if at least two lines of said stored image remain to be processed, processing a next line of said stored image by the steps of:

(a) incrementing said counter by I;

(b) copying said next line into an output storage area in which the reduced image is to be stored;

(c) comparing the counter value to T;

(d) if the counter value is not between $T-S$ and T, then (i) discarding the next line of said stored image;

(ii) decrementing the counter by S; and (e) if the counter value is between $T-S$ and T, then omitting said steps (i) and (ii);

(6) repeating said processing steps (a)–(e) on the other lines of said stored image until no more than one image line in said input storage area remains to be processed; then (7) copying the remaining image line, if any, in said input storage area to said output storage area;

repeating said step of removing a predetermined number of times to achieve a reduction by a factor of F along said one orthogonal axis; and rotating said reduced image in said output storage area in a second direction opposite said first direction by ninety degrees.

8. A system for reducing a binary digital image along one of two orthogonal axes by any factor F greater than 1.0 and or equal to 2.0, comprising:

input storage area means, in a computer, for storing said image in raster scan order;

output storage area means, in the computer, for storing the reduced image;

means for selecting an integer T for use as a threshold and an integer S such that the rounded value of $(F-1)*S$ is not equal to zero;

means for selecting a number of lines L to copy at the beginning of the reduction process, where L is an integer greater than or equal to zero and less than or equal to $1/(F-1)$;

a counter;

means for initializing said counter to $T+D-(I*X)$, where X is an integer equal to L if L is greater than zero or to the integer quotient $1/(F-1)$ otherwise, I is the rounded vaue of $(F-1)*S$, and D is 1 if $S>0$;

means, if L is zero, for discarding the first line of said stored image;

means, if at least two lines of said stored image remain to be processed, for processing a next line of said stored image, comprising:

(1) means for incrementing said counter by I;

(2) means for copying said next line into said output storage area means;

(3) means for comparing the counter value to T;

(4) means, if the counter value is not between $T-S$ and T, for discarding the next line of said stored image;

(5) means for decrementing the counter by S after each operation of said discarding means;

(6) means, if the counter value is between $T-S$ and T, for avoiding the operation of said discarding means;

means for repeating the operation of said processing means for the other lines of said stored image until no more than one image line in said input storage area means remains to be processed; and means for copying the remaining image line, if any, in said input storage area means to said output storage area means.

9. A system according to claim 8 wherein said discarding means transfers selected information from each discarded line to a previous copied line in said output storage area means based upon the values of the bits in the discarded line and at least one neighboring copied line.

10. A system for reducing a binary digital image along one of two orthogonal axes by any factor, comprising:

input storage area means, in a computer, for storing said image in raster scan order;

output storage area means, in said computer, for storing the reduced image;

means for rotating said storage image in said input storage area means in a first direction by ninety degrees;

means for discarding one or more lines of bits along said one of said orthogonal axes of said storage image to convert i lines of bits to j lines of bits, where $0.5i \leq j < i$, comprising:

(1) means for selecting an integer T for use as a threshold and an integer S such that the rounded value of $(F-1)*S$ is not equal to zero;

(2) means for selecting a number of lines L of said stored image to copy at the beginning of the reduction process, where L is an integer greater than or equal to zero and less than or equal to $1/(F-1)$;

(3) a counter;

(4) means for initializing said counter to $T+D-(I*X)$, where X is an integer equal to L if L is greater than zero or to the integer quotient $1/F-1)$ otherwise, I is the rounded value of $(F-1)*S$, and D is 1 if $S>0$;

(5) means, if L is zero, for discarding the first line of said stored image;

(6) means, if at least two lines of said stored image remain to be processed, for processing a next line of said stored image comprising:

(a) means for incrementing said counter by I;

(b) means for copying said next line into said ouput storage area means;

(c) means for comparing the counter value to T;

(d) means, if the counter value is not between T−S and T, for discarding the next line of said stored image;

(e) means for decrementing the counter by S after each operation of said discarding means (d);

(f) means, if the counter value is between T−S, and T, for avoiding the operation of said discarding means (d);

means for repeating the operation of said processing means on the other lines of said stored image until no more than one image line in said input storage area means remains to be processed;

means for copying the remaining image line, if any, in said input storage area means to said output storage area means; and means for rotating said reduced image in said output storage area means in a second direction opposite said first direction by ninety degrees.

* * * * *